United States Patent
Gilbert-Schachter et al.

(10) Patent No.: US 8,391,702 B2
(45) Date of Patent: Mar. 5, 2013

(54) REDUCED PRE-FLASH FOR LED FLASH BASED CAMERA DEVICES

(75) Inventors: Yochanan Cliel Manoach Gilbert-Schachter, Waterloo (CA); Qian Wang, Waterloo (CA)

(73) Assignee: Research In Motion Limited, Waterloo (CA)

( * ) Notice: Subject to any disclaimer, the term of this patent is extended or adjusted under 35 U.S.C. 154(b) by 27 days.

(21) Appl. No.: 12/971,571

(22) Filed: Dec. 17, 2010

(65) Prior Publication Data
US 2012/0155846 A1 Jun. 21, 2012

(51) Int. Cl.
*G03B 15/03* (2006.01)
(52) U.S. Cl. .............. 396/157; 362/3; 348/371
(58) Field of Classification Search .......... 396/157; 362/3; 348/371
See application file for complete search history.

(56) References Cited

U.S. PATENT DOCUMENTS

| | | | |
|---|---|---|---|
| 4,998,128 A | 3/1991 | Coltman | |
| 5,371,568 A * | 12/1994 | Takagi et al. | 396/157 |
| 5,864,722 A * | 1/1999 | Aoki et al. | 396/263 |
| 6,272,292 B1 | 8/2001 | Iwasaki et al. | |
| 6,512,891 B2 | 1/2003 | Matsui | |
| 6,885,405 B1 | 4/2005 | Steinberg | |
| 2002/0061190 A1 | 5/2002 | Kawasaki | |
| 2006/0165399 A1 | 7/2006 | Feng | |
| 2007/0147822 A1 * | 6/2007 | Tanaka | 396/158 |
| 2007/0189752 A1 | 8/2007 | Kobayashi | |
| 2007/0248342 A1 * | 10/2007 | Tamminen et al. | 396/67 |
| 2007/0280660 A1 | 12/2007 | Yeh | |
| 2008/0193119 A1 | 8/2008 | Miyazaki | |
| 2010/0188530 A1 | 7/2010 | Steinberg | |

OTHER PUBLICATIONS

European Search Report dated Apr. 15, 2011. In corresponding application No. 10195724.9.
Examination Report mailed Aug. 9, 2012, in corresponding European patent application No. 10195724.9.

* cited by examiner

*Primary Examiner* — Christopher Mahoney
*Assistant Examiner* — Fang-Chi Chang
(74) *Attorney, Agent, or Firm* — Novak Druce Connolly Bove + Quigg LLP

(57) ABSTRACT

A mobile device comprising a processor, a camera module, and a flash configured to generate at least one of a reduced pre-flash, a standard pre-flash and a flash. The processor, in response to receiving an image capture request, is configured to receive a brightness value and determine a flash status based on a flash setting with the flash status being one of an off mode, on mode, and auto mode. In the event the flash status is one of the on mode and auto mode, determine whether there is sufficient light to capture an image based at least in part on a comparison of the brightness value and a flash threshold. In the event the brightness value is greater than the flash threshold, cause the flash to generate a shortened pre-flash and obtain only a white balance measurement and an auto-exposure measurement during the shortened pre-flash.

24 Claims, 3 Drawing Sheets

REDUCED PRE-FLASH FOR LED FLASH BASED CAMERA DEVICES

FIELD OF TECHNOLOGY

The present disclosure relates generally to the pre-flash for a camera device. More specifically, the present disclosure relates to a camera device and a method for using a shortened pre-flash for a camera device having a flash, such as a light emitting diode (LED) flash.

BACKGROUND

Cameras are becoming more prevalent and more advanced. Advances are being made with respect to flashes for camera devices. Camera devices can include standalone cameras, mobile devices having a camera module, or any other device that includes a camera module capable of taking pictures. Mobile devices can include, but are not limited to, cellular telephones, smart telephones, wireless personal digital assistants (PDAs), and laptop computers having a camera module capable of taking pictures. When taking a picture with a camera device having a flash, the flash can be irritating to the eyes of one or more people in the picture and can affect the eyes of one or more people near the camera as well. For example, when the flash is being used and a user presses the shutter release of the camera device, the flash emits a pre-flash and captures data. Using the pre-flash data, the camera device can determine a focus point, set a white balance value and set the exposure for a picture. The pre-flash can last for 1-5 seconds for an LED flash and can be irritating to the eyes of the people within the flash area. In addition, the pre-flash can cause one or more people having their picture taken to close their eyes which can cause an additional photo to be taken. The additional photo can require additional time and memory space.

BRIEF DESCRIPTION OF THE DRAWINGS

Implementations of the present application will now be described, by way of example only, with reference to the attached Figures, wherein.

DETAILED DESCRIPTION

Figure 1:
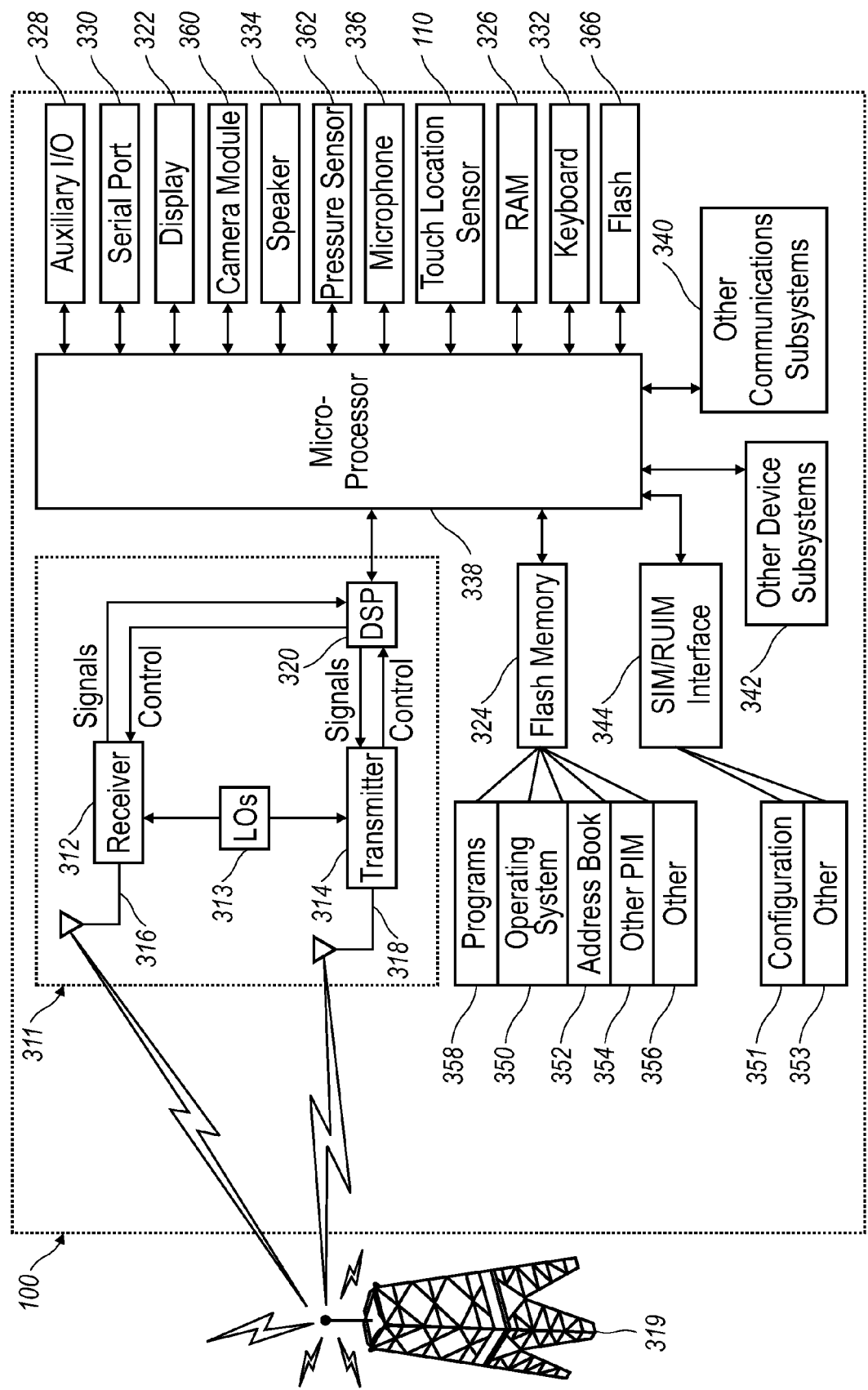
FIG. 1 is a block diagram of a mobile device in a communication network in accordance with an exemplary implementation.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected, whether directly or indirectly through intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

The present disclosure describes camera devices, such as a mobile device having a camera module, and methods for using a shortened pre-flash when taking pictures with a flash, such as an LED flash. A shortened pre-flash is a pre-flash that has a shorter duration compared to a standard pre-flash. The pre-flash durations can be device specific. An example of a standard pre-flash can be between 2-5 seconds and a shortened pre-flash can be less than 400 milliseconds. In one or more implementations, the shortened pre-flash can be zero. The shortened pre-flash can be used to obtain only a white balance measurement and an auto-exposure measurement compared to a standard pre-flash which can be used to obtain a white balance measurement, an auto-exposure measurement and auto-focus. Based on a flash status, for example, on mode, off mode or auto mode, and a brightness value, a shortened pre-flash can be used in place of the longer standard pre-flash. For example, in the event that there is sufficient light to capture an image, the shortened pre-flash can be utilized. In another example, if there is not sufficient light to capture an image but there is sufficient light to execute auto-focus, the shortened pre-flash can be utilized. By avoiding the auto-focus during the pre-flash, the camera device is able to use the shortened pre-flash. By using a shortened pre-flash, there can be a reduction of the amount of eye irritation compared to standard pre-flash.

Referring to FIG. 1, a block diagram of a mobile device in a communication network in accordance with an exemplary implementation is illustrated. As shown, the mobile device 100 can include a microprocessor or processor 338 that controls the operation of the mobile device 100, such as facilitating communications, providing a graphical user interface, executing programs, and so forth. A communication subsystem 311 performs communication transmission and reception with the wireless network 319. The microprocessor 338 further can be coupled with an auxiliary input/output (I/O) subsystem 328 that can be coupled to the mobile device 100. Additionally, in at least one implementation, the microprocessor 338 can be coupled to a serial port (for example, a Universal Serial Bus port) 330 that facilitates communication with other devices or systems via the serial port 330. A display 322 can be communicatively coupled to the microprocessor 338 to facilitate display of information to an operator of the mobile device 100. When the mobile device 100 is equipped with a keyboard 332, which may be physical or virtual (for example, displayed), the keyboard 332 can be communicatively coupled to the microprocessor 338. The mobile device 100 can include one or more speakers 334 and one or more microphones 336, which can be communicatively coupled to the microprocessor 338 as discussed in further detail below. The mobile device 100 can include a camera module 360 and a flash 366 as described below. Other similar components can be provided on or within the mobile device 100 and are optionally communicatively coupled to the microprocessor 338. Other communication subsystems 340 and other mobile device subsystems 342 are generally indicated as communicatively coupled with the microprocessor 338. An example of a communication subsystem 340 is a short-range communication system such as a BLUETOOTH® communication module or a WI-FI® communication module (a communication module in compliance with IEEE 802.11b) and associated circuits and components. Additionally, the microprocessor 338 can perform operating system functions and can execute programs or software applications or firmware applications on the mobile device 100. In some implementations, not all of the above components are included in the mobile device 100. The auxiliary I/O subsystem 328 can take the form of one or more different navigation tools (multi-directional or single-directional), external display devices such as keyboards, and other subsystems capable of providing input or receiving output from the mobile device 100.

Figure 3:
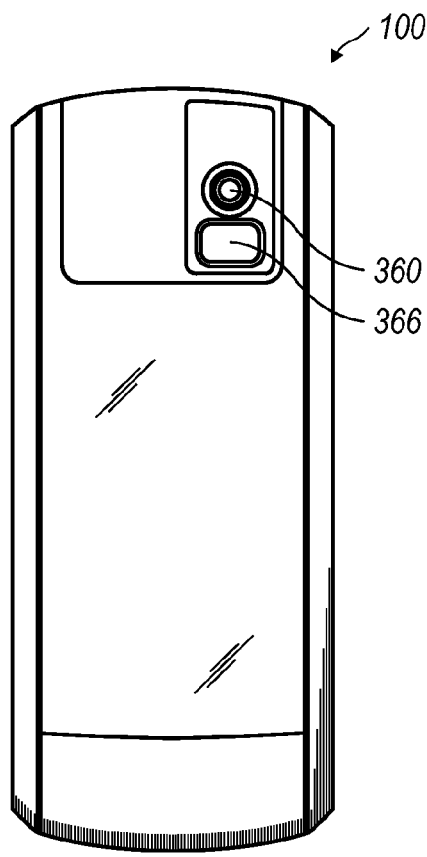
FIG. 3 is back view of a mobile device having a camera module and a flash in accordance with an exemplary implementation.

Referring to FIG. 3, a back view of a mobile device having a camera module and a flash in accordance with an exemplary implementation is illustrated. As shown, the mobile device 100 can include a camera module 360 and a flash 366. The camera module 360 can be used to take pictures. The flash 366 can be used to generate shortened pre-flashes, pre-flashes and flashes. The flash 366 can be an LED, a tube filled with xenon gas, or any other flash that can generate pre-flashes and flashes. The flash 366 can be part of a camera device or mobile device 100. In one or more implementations, the flash 366 can be communicatively coupled to the camera device or mobile device 100.

The mobile device 100 can be equipped with components to enable operation of various programs, as shown in FIG. 1. As shown, the memory or memory component 324 can provide storage for the operating system 350, device programs 358, data, and so forth. The operating system 350 can be generally configured to manage other programs 358 that are also stored in memory 324 and are executable on the processor 338. The operating system 350 can receive, process and respond to requests for services made by programs 358 through predefined program 358 interfaces. More specifically, the operating system 350 can typically determine the order in which multiple programs 358 are executed on the processor 338 and the execution time allotted for each program 358, manages the sharing of memory 324 among multiple programs 358, handles input and output to and from other device subsystems 342, and so forth. In addition, operators can interact directly with the operating system 350 through a user interface, typically including the keyboard 332 and display 322. The operating system 350, programs 358, data, and other information can be stored in memory 324, RAM 326, read-only memory (ROM), or another suitable storage element (not shown). An address book 352, personal information manager (PIM) 354, and other information 356 can also be stored.

The mobile device 100 can be enabled for two-way communication within voice, data, or voice and data communication systems. A Subscriber Identity Module (SIM) or Removable User Identity Module (RUIM) can be utilized to authorize communication with the communication network 319. A SIM/RUIM interface 344 within the mobile device 100 can interface a SIM/RUIM card to the microprocessor 338 and facilitates removal or insertion of a SIM/RUIM card (not shown). The SIM/RUIM card features memory and can hold key configurations 351, and other information 353 such as identification and subscriber related information. The mobile device 100 can be equipped with an antenna 318 for transmitting signals to the communication network 319 and another antenna 316 for receiving communication from the communication network 319. Alternatively, a single antenna (not shown) can be utilized to transmit and receive signals. A communication subsystem 311 can include a transmitter 314 and receiver 312, one or more antennae 316, 318, local oscillators (LOs) 313, and a processing module 320 such as a digital signal processor (DSP) 320.

The mobile device 100 can include a touch-sensitive display or touchscreen that includes one or more touch location sensors, an overlay, and a display 322, such as a liquid crystal display (LCD) or light emitting diode (LED) display. The touch location sensor(s) can be a pressure sensor 362, capacitive sensor, resistive sensor, infrared sensor, surface acoustic wave (SAW) sensor, or other type of touch-sensitive sensor(s) and can be integrated into the overlay. The overlay, or cover, can be comprised of laminated glass, plastic, or other suitable material(s) and is advantageously translucent or transparent. A touch, or touch contact, can be detected by the touchscreen and processed by the processor 338, for example, to determine a location of the touch or touch contact. Touch location data can include the center of the area of contact or the entire area of contact for further processing. A touch may be detected from a contact member, such as a body part of a user, for example a finger or thumb, or other objects, for example a stylus, pen, or other pointer, depending on the nature of the touch location sensor.

Figure 2:
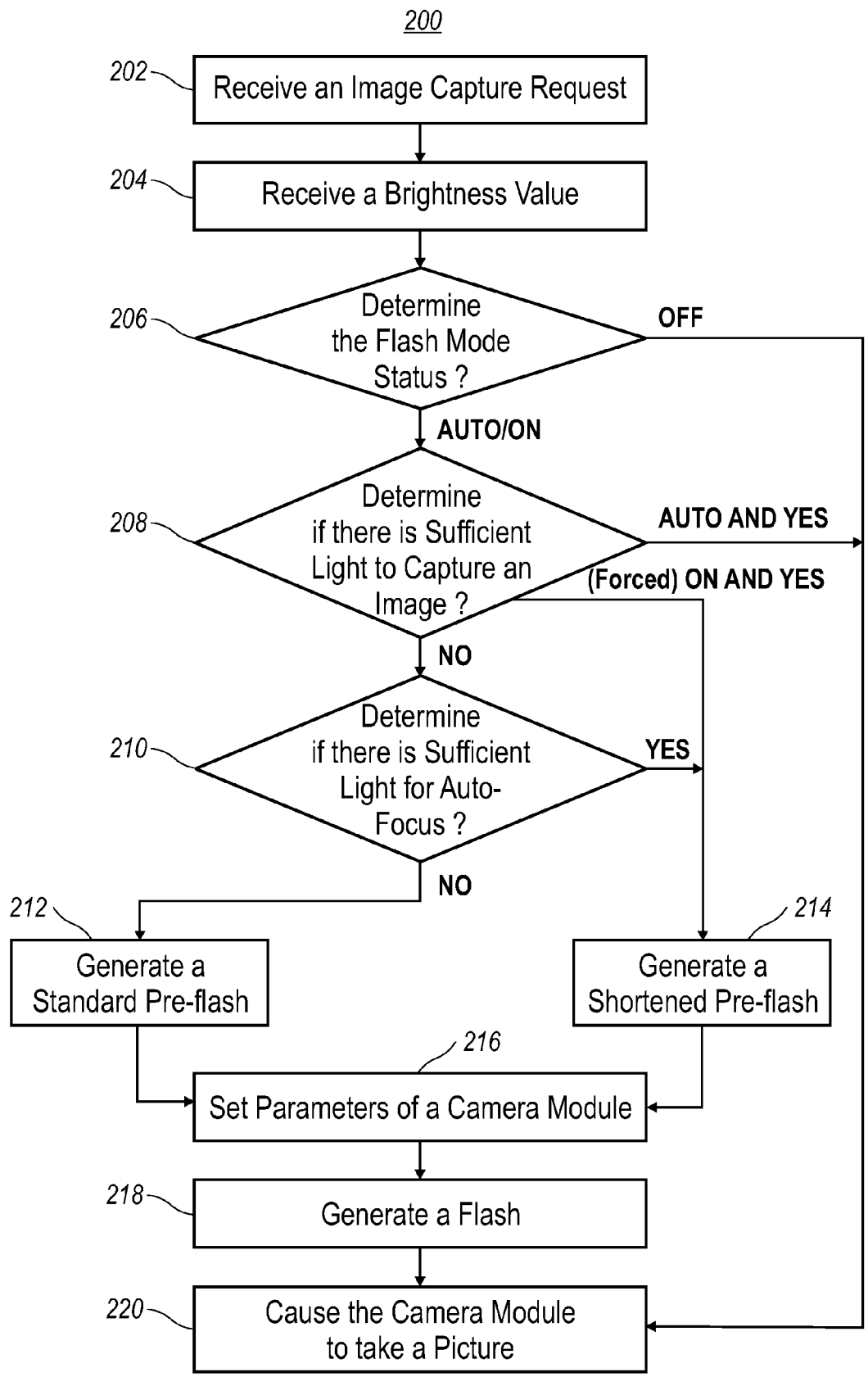
FIG. 2 is a flowchart of a method for taking a picture with a camera device using a shortened pre-flash in accordance with an exemplary implementation.

Referring to FIG. 2, a flowchart of a method for taking a picture using a device having a shortened pre-flash in accordance with an exemplary implementation is illustrated. The exemplary method 200 is provided by way of example, as there are a variety of ways to carry out the method. The method 200 described below can be carried out using the mobile devices and communication network shown in FIG. 1 by way of example, and various elements of these figures are referenced in explaining exemplary method 200. Each block shown in FIG. 2 represents one or more processes, methods or subroutines, carried out in exemplary method 200. The exemplary method 200 may begin at block 202.

Figure 5:
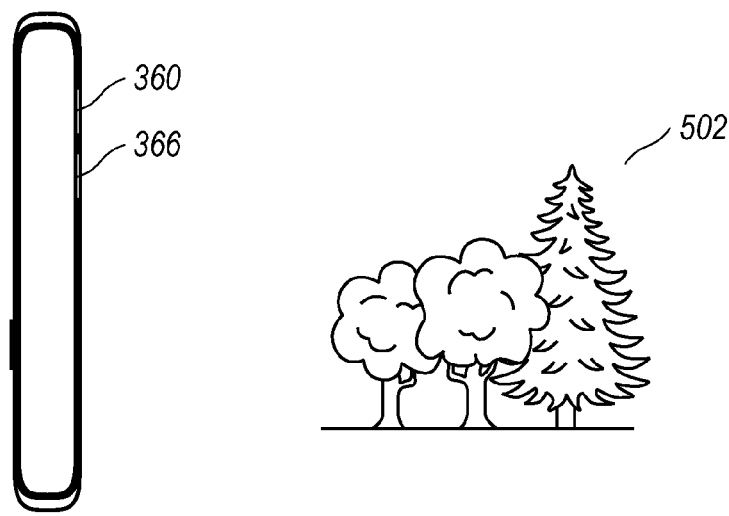
FIG. 5 is side view of a mobile device taking a picture in accordance with an exemplary implementation.

At block 202, an image capture request can be received. For example, the processor or microprocessor 338 of a camera device or a mobile device 100 having a camera module 360 can receive an image capture request. As shown in FIG. 5, the camera device or mobile device 100 can be used to take a picture of a subject, such as trees 502. The image capture request can be received in response to a user pressing a picture button or shutter button (not shown) which results in an image capture request being sent to the processor 338. After receiving an image capture request, the method 200 can proceed to block 204.

At block 204, a brightness value can be received. For example, the processor or microprocessor 338 can receive a brightness value. The brightness value can come from an ambient light sensor (not shown), a view finder (not shown), camera module 260, or any other component that can provide a brightness value to the processor 338. In one or more implementations, the processor 338 can receive multiple brightness values and can choose one using known techniques. In one or more implementations, the brightness value can be received indirectly. For example, the brightness value can be estimated by taking the calculated optimal exposure time and gain. After receiving the brightness value, the method 200 can proceed to block 206.

Figure 4:
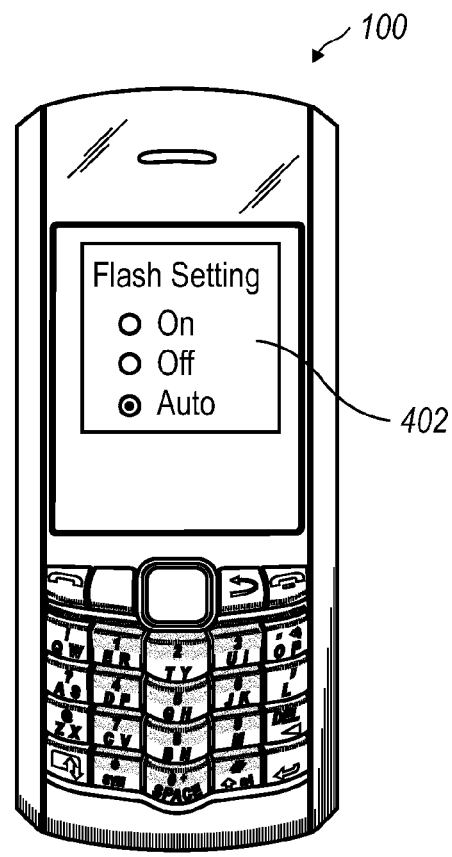
FIG. 4 is front view of a mobile device with the flash status being displayed in accordance with an exemplary implementation.

At block 206, the flash mode status can be determined. For example, the processor or microprocessor 338 can determine the flash mode status which can include, but not limited to, an on mode, off mode and auto mode. As shown in FIG. 4, the flash setting 402 can be displayed on the display 322 of the mobile device 100. The on mode (or forced on mode) can require the flash to generate a flash in response to receiving an image capture request. The off mode ensures that the flash will not generate a flash in response to receiving an image capture request. The auto mode can allow the processor 338 to determine whether a flash is needed based on one or more parameters, such as a brightness value. Thus, in the auto mode, depending on the brightness value, a shortened pre-flash can be used as described below in order to reduce the amount of eye irritation. In the event the flash mode status is determined to be in the off mode, the method can proceed to block 220. In the event the flash mode status is determined to be in the on mode or auto mode, the method can proceed to block 208.

At block 208, a determination is made whether there is sufficient light to capture an image. In one or more implementation, the processor or microprocessor 338 can compare the brightness value and a flash threshold. The flash threshold can be stored in memory 324. The flash threshold can be a set value based on the specifications of the camera module 360. For example, the flash threshold can be 90 lux. The flash threshold can be a set value for the auto-focus feature. For example, the flash threshold can determine whether a standard pre-flash or a shortened pre-flash can be used. The shortened pre-flash can reduce eye irritation. In the event the brightness value is not greater than the flash threshold, the method 200 can proceed to block 210. In the event the flash mode status is in on mode (or forced on mode) and the brightness value is greater than the flash threshold, then the method 200 can proceed to block 214. In the event the brightness value is greater than the flash threshold and the flash mode status is auto mode, then the method 200 can proceed to block 220.

At block 210, a determination is made whether there is sufficient light for auto-focus. For example, the processor or microprocessor 338 can compare the brightness value to an auto-focus threshold. The auto-focus threshold can be stored in memory 324. The auto-focus threshold can be a set value based on the specifications of the camera module 360. For example, the auto-focus threshold can be 50 lux. The auto-focus threshold can be a set value for determining whether there is sufficient light to perform auto-focusing. In the event the brightness value is greater than the auto-focus threshold, then the method 200 can proceed to block 214. In the event the brightness value is not greater than the auto-focus threshold, then the method 200 can proceed to block 212.

At block 212, a standard pre-flash can be generated. For example, the processor or microprocessor 338 can cause the flash to generate a standard pre-flash. The standard pre-flash is dependent on the specifications of the camera module 360 and associated flash 366. The flash 366 can be a light emitting diode (LED), a tube substantially filled with xenon gas, or any other flash device that can produce a standard pre-flash. In response to generating the standard pre-flash, the processor or microprocessor 338 obtains a white balance measurement, an auto-exposure measurement and auto-focus during the standard pre-flash. After generating the standard pre-flash and obtaining the camera parameters, the method 200 can proceed to block 216.

At block 214, a shortened pre-flash can be generated. For example, the processor or microprocessor 338 can cause the flash to generate a shortened pre-flash. The shortened pre-flash is dependent on the specifications of the camera module 360 and associated flash 366. In one or more implementations, the shortened pre-flash can be zero (which results in no-pre-flash). The flash 366 can be a light emitting diode (LED), a tube substantially filled with xenon gas, or any other flash device that can produce a shortened pre-flash. In response to generating the shortened pre-flash, the processor or microprocessor 338 obtains only a white balance measurement and an auto-exposure measurement. The auto-focus can be done before or after the shortened pre-flash. After generating the shortened pre-flash and obtaining the camera parameters, the method 200 can proceed to block 216.

At block 216, the parameters of a camera module can be set. For example, the processor or microprocessor 338 can set the parameters of the camera module 366. The parameters can include the white-balance measurement, auto-exposure measurement, and auto focus. For example, if a standard pre-flash was used, the parameters can be based on the white balance measurement, an auto-exposure measurement and auto-focus obtained during the standard pre-flash. In another example, if a shortened pre-flash was used, the parameters can be based on the white balance measurement and an auto-exposure measurement obtained during the shortened pre-flash and the auto-focus obtained before or after the shortened pre-flash. After setting the parameters of the camera module 366, the method can proceed to block 218.

At block 218, a flash is generated. For example, the processor or microprocessor 338 can cause the flash 366 to generate a flash. The flash 366 can be a light emitting diode (LED), a tube substantially filled with xenon gas, or any other flash device that can produce a flash. The duration of the flash can be based on the information gathered during the pre-flash, for example the standard pre-flash or the shortened pre-flash. After generating the flash, the method 200 can proceed to block 220.

At block 220, the camera module can take a picture. For example, the processor or microprocessor 338 can cause the camera module 360 to take a picture.

Exemplary implementations have been described hereinabove regarding the implementation of pairing short range wireless devices with a mobile device. Various modifications to and departures from the disclosed implementations will occur to those having skill in the art. The subject matter that is intended to be within the spirit of this disclosure is set forth in the following claims.

The invention claimed is:

1. A camera device comprising:
    a flash configured to generate a shortened pre-flash, a standard pre-flash and a flash; and
    a processor, communicatively coupled to the flash, in response to receiving a picture request, configured to:
    receive a brightness value;
    determine a flash status based on a flash setting with the flash status being one of an off mode, on mode, and auto mode;
    in the event the flash status is one of the on mode and auto mode, determine whether there is sufficient light to capture an image based at least in part on a comparison of the brightness value and a flash threshold; and
    in the event the brightness value is greater than the flash threshold and the flash status is in the on mode, cause the flash to generate a shortened pre-flash and obtain only a white balance measurement and an auto-exposure measurement during the shortened pre-flash.

2. The camera device of claim 1 wherein in response to generating the shortened pre-flash, the processor is further configured to:
set parameters of a camera module, communicatively coupled to the processor, based on the white balance measurement and the auto-exposure measurement;
cause the flash to generate a flash; and
cause the camera module to take a picture.

3. The camera device of claim 1 wherein,
in the event the brightness value is greater than the flash threshold and the flash status is in the auto mode, the processor is further configured to cause a camera module to take a picture without a flash.

4. The camera device of claim 1 wherein,
in the event the flash status is one of the on mode and auto mode and the brightness value is not greater than a flash threshold, the processor is further configured to:
determine whether there is sufficient light to perform an auto-focus based at least in part on a comparison of the brightness value and an auto-focus threshold; and
in the event the brightness value is greater than the auto-focus threshold, the processor is further configured to:
cause the flash to generate a shortened pre-flash and obtain only a white balance measurement and an auto-exposure measurement during the shortened pre-flash;
set parameters of a camera module, communicatively coupled to the processor, based on the white balance measurement and the auto-exposure measurement;
cause the flash to generate a flash; and
cause the camera module to take a picture.

5. The camera device of claim 1 wherein,
in the event the flash status is one of the on mode and auto mode and the brightness value is not greater than a flash threshold, the processor is further configured to:
determine whether there is sufficient light to perform an auto-focus based at least in part on a comparison of the brightness value and an auto-focus threshold; and
in the event the brightness value is not greater than the auto-focus threshold, the processor is further configured to:
cause the flash to generate a standard pre-flash and obtain a white balance measurement, an auto-exposure measurement and auto-focus during the generated standard pre-flash;
set parameters of a camera module, communicatively coupled to the processor, based on the white balance measurement, the auto-exposure measurement and the auto-focus;
cause the flash to generate a flash; and
cause the camera module to take a picture.

6. The camera device of claim 1 wherein, in the event the flash status is in the off mode, the processor is further configured to cause a camera module to take a picture without a flash.

7. The camera device of claim 1 wherein the flash is one of a light emitting diode (LED) and a tube substantially filled with xenon gas.

8. The camera device of claim 1 wherein the shortened pre-flash has a duration.

9. A processor implemented method for taking a picture using a camera device, the method comprising: receiving a brightness value in response to receiving a picture request; determining a flash status for a flash based on a flash setting with the flash status being one of an off mode, on mode, and auto mode, wherein the flash is capable of generating a shortened pre-flash, a standard pre-flash and a flash; in the event the flash status is one of the on mode and auto mode, determining whether there is sufficient light to capture an image based at least in part on a comparison of the brightness value and a flash threshold; and in the event the brightness value is greater than the flash threshold and the flash status is in the on mode, causing a flash to generate a shortened pre-flash and obtain only a white balance measurement and an auto-exposure measurement during the generated shortened pre-flash.

10. The processor implemented method of claim 9 wherein in response to generating the shortened pre-flash,
setting parameters of a camera module based on the white balance measurement and the auto-exposure measurement;
causing the flash to generate a flash; and
causing the camera module to take a picture.

11. The processor implemented method of claim 9 wherein,
in the event the brightness value is greater than the flash threshold and the flash status is in the auto mode,
causing a camera module to take a picture without a flash.

12. The processor implemented method of claim 9 wherein,
in the event the flash status is one of the on mode and auto mode and the brightness value is not greater than the flash threshold,
determining whether there is sufficient light to perform an auto-focus based at least in part on a comparison of the brightness and an auto-focus threshold; and
in the event the brightness value is greater than the auto-focus threshold,
causing the flash to generate a shortened pre-flash and obtain only a white balance measurement and an auto-exposure measurement during the shortened pre-flash;
setting parameters of a camera module based on the white balance measurement and the auto-exposure measurement;
cause the flash to generate a flash; and
cause the camera module to take a picture.

13. The processor implemented method of claim 9 wherein,
in the event the flash status is one of the on mode and auto mode and the brightness value is not greater than the flash threshold,
determining whether there is sufficient light to perform an auto-focus based at least in part on a comparison of the brightness value and an auto-focus threshold; and
in the event the brightness value is not greater than the auto-focus threshold,
causing the flash to generate a standard pre-flash and obtain a white balance measurement, an auto-exposure measurement, and auto-focus during the generated standard pre-flash;
setting parameters of a camera module based on the white balance measurement, the auto-exposure measurement, and the auto-focus;
cause the flash to generate a flash; and
cause the camera module to take a picture.

14. The processor implemented method of claim 9 wherein, in the event the flash status is in the off mode, causing a camera module to take a picture without a flash.

15. The processor implemented method of claim 9 wherein the flash is one of a light emitting diode (LED) and a tube filled with xenon gas.

16. The processor implemented method of claim 9 wherein the shortened pre-flash has a duration.

17. A non-transitory computer readable medium storing instructions for configuring a camera device to take a picture in response to receiving a picture request, the camera device having a processor to execute instructions on the processor to: receive a brightness value; determining a flash status for a flash based on a flash setting with the flash status being one of an off mode, on mode, and auto mode, wherein the flash is capable of generating a shortened pre-flash, a standard pre-flash and a flash; in the event the flash status is one of the on mode and auto mode, determine whether there is sufficient light to capture an image based at least in part on a comparison of the brightness value and a flash threshold; and in the event the brightness value is greater than the flash threshold and the flash status is in the on mode, cause the flash to generate a shortened pre-flash and obtain only a white balance measurement and an auto-exposure measurement during the generated shortened pre-flash.

18. The non-transitory computer readable medium of claim 17 further comprising instructions to, in response to generating the shortened pre-flash,
 set parameters of a camera module, communicatively coupled to the processor, based on the white balance measurement and the auto-exposure measurement;
 cause the flash to generate a flash; and
 cause the camera module to take a picture.

19. The non-transitory computer readable medium of claim 17 further comprising instructions to:
 in the event the brightness value is greater than the flash threshold and the flash status is in auto mode, cause a camera module to take a picture without a flash.

20. The non-transitory computer readable medium of claim 17 further comprising instructions to:
 in the event the flash status is one of the on mode and auto mode and the brightness value is not greater than the flash threshold,
 determine whether there is sufficient light to perform an auto-focus based at least in part on a comparison of the brightness value and an auto-focus threshold; and
 in the event the brightness value is greater than the auto-focus threshold,
 cause the flash to generate a shortened pre-flash and obtain only a white balance measurement and an auto-exposure measurement during the generated shortened pre-flash;
 set parameters of a camera module, communicatively coupled to the processor, based on the white balance measurement and the auto-exposure measurement;
 cause the flash to generate a flash; and
 cause the camera module to take a picture.

21. The non-transitory computer readable medium of claim 17 further comprising instructions to:
 in the event the flash status is one of the on mode and auto mode and the brightness value is not greater than the flash threshold, the processor is further configured to:
 determine whether there is sufficient light to perform an auto-focus based at least in part on a comparison of the brightness value and an auto-focus threshold; and
 in the event the brightness value is not greater than the auto-focus threshold, the processor is further configured to:
 cause the flash to generate a standard pre-flash and obtain a white balance measurement, an auto-exposure measurement and auto-focus during the standard pre-flash;
 set parameters of a camera module, communicatively coupled to the processor, based on the white balance measurement, the auto-exposure measurement and the auto-focus;
 cause the flash to generate a flash; and
 cause the camera module to take a picture.

22. The non-transitory computer readable medium of claim 17 further comprising instructions to, in the event the flash status is in the off mode, cause a camera module to take a picture without a flash.

23. The non-transitory computer readable medium of claim 17 wherein the flash is one of a light emitting diode (LED) and a tube filled with xenon gas.

24. The non-transitory computer readable medium of claim 17 wherein the shortened pre-flash has a duration.

\* \* \* \* \*